March 9, 1965 J. S. SMITH Re. 25,741

MARKING ELEMENT AND DISPENSING MEANS THEREFOR

Original Filed June 24, 1953

INVENTOR.
John Sherman Smith
BY
William J. Comsky Jr.
ATTORNEY

United States Patent Office

Re. 25,741
Reissued Mar. 9, 1965

25,741
MARKING ELEMENT AND DISPENSING MEANS THEREFOR

John Sherman Smith, Atlanta, Ga., assignor to Scripto, Inc., a corporation of Georgia Original No. 2,774,331, dated Dec. 18, 1956, Ser. No. 363,769, June 24, 1953. Application for reissue Dec. 16, 1958, Ser. No. 781,184
5 Claims. (Cl. 120—19)

Matter enclosed in heavy brackets [ ] appears in the original patent but forms no part of this reissue specification; matter printed in italics indicates the additions made by reissue.

This invention relates in general to marking elements that are characteristically soft, such as crayons and cosmetic stick materials, and more particularly to an improved arrangement of a supply of such marking elements and to dispensing means therefor.

In prior Patent No. 2,595,001, issued April 29, 1952, a crayon pencil mechanism is disclosed in which the crayon or other similar marking element is arranged comparably to a pencil lead for feeding; that is, the marking element is gripped only at its rear end by the clutch of the feed mechanism and extends loosely toward the writing end of the pencil for feeding. This arrangement works well with crayons having relatively stiff formulations, but it cannot be used satisfactorily with very soft crayons because of the lack of support for the marking element.

Use of the softer crayons is highly desirable in many instances because of their better marking qualities on some types of surfaces, but these soft crayons are extremely sensitive to temperature changes, becoming appreciably softer at higher temperatures, and becoming very brittle at low temperatures (i.e., 50° F. or less). As a result, the use of such crayons is substantially hampered by the fact that they commonly exhibit insufficient stiffness to support themselves, or such brittleness as to shatter easily upon impact. The same general conditions exist as to cosmetic stick materials, such as lipstick, eyebrow pencil, and the like.

According to the present invention an arrangement is provided by which a supply of soft crayon or other similar marking element is incased in a rigid protective sleeve and adapted for dispensing therefrom by an improved form of feed mechanism of the general type disclosed in the above noted prior Patent No. 2,595,001. By this arrangement, the marking element supply may be used effectively despite conditions that may make it over-soft or brittle, and the supply may be provided conveniently in the form of a refill unit for continual replacement in a single dispensing means.

These and other features of the present invention are described in further detail below, in connection with the accompanying drawings, in which.

Figure 1:
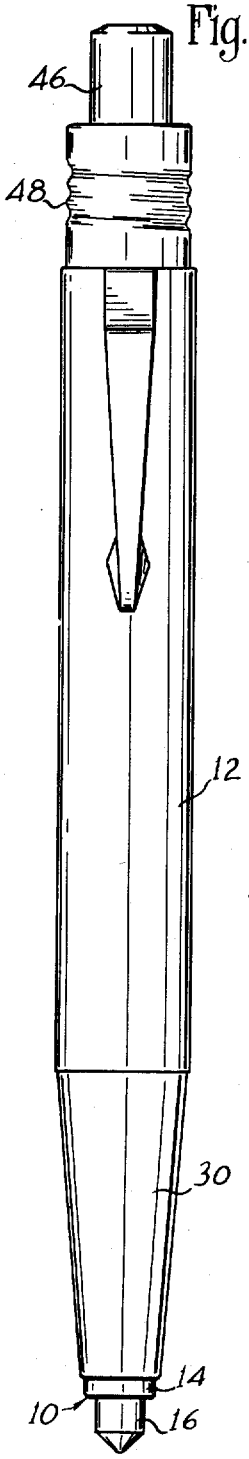
FIG. 1 is an elevation of a dispensing means for a marking element embodying the present invention.

In the drawings, the marking element of the present invention is designated generally by the reference numeral 10, and FIG. 1 shows the marking element 10 projected for use from a housing 12.

Figure 2:
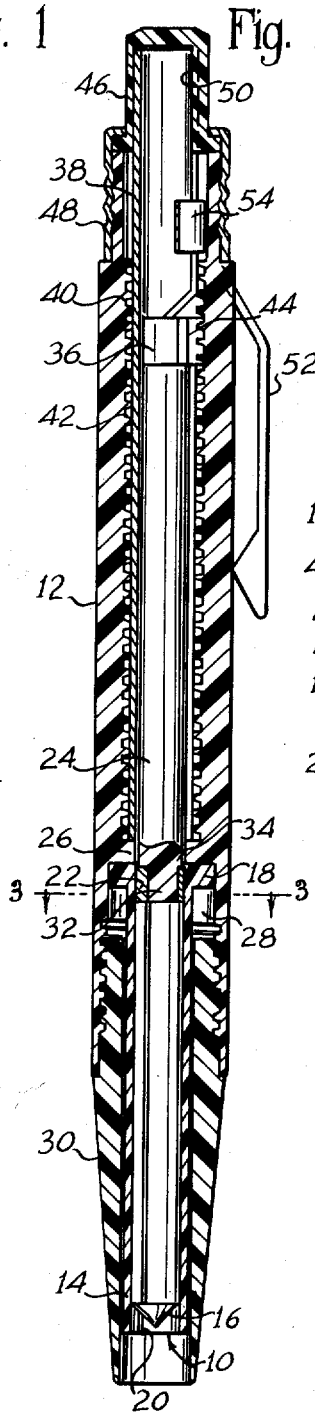
FIG. 2 is a vertical section corresponding to FIG. 1, except for showing the marking element in retracted position.
Figure 3:
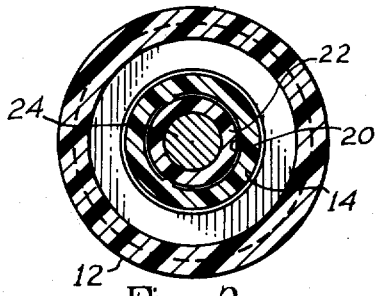
FIG. 3 is a transverse section taken substantially at the line 3—3 in F.G. 2.

FIG. 2 shows the arrangement of the marking element 10 further as comprising a protective sleeve 14 incasing a marking element supply 16. The sleeve 14 is formed of a relatively rigid material, suitably a rigid plastic material, in order to serve its protective function; and is formed exteriorly with an abutment portion, which may conveniently consist of an outwardly extending flange 18 at the rear end thereof, for assembly with the housing 12 as will be explained more in detail presently.

The protective sleeve 14 is further characterized by longitudinal ridges 20 extending interiorly thereof throughout its entire length (compare FIGS. 2, 3, 5 and 6). These ridges 20 serve as an effective means for disposing the sleeve 14 in covering relation with the marking element supply 16, which will vary in diameter due to manufacturing tolerances, but which is nevertheless held properly within sleeve 14 by the ridges 20 despite such variations in diameter. In addition, the ridges 20 also provide means for engaging the dispensing mechanism contained within the housing 12 to feed the marking element supply 16 for use.

For the latter purpose, a flexible collar 22 is arranged within the rear end of sleeve 14 to engage the longitudinal ridges 20 and to grip frictionally the forwardly extending end of a dispensing plunger 24 operated by a feed mechanism disposed in the rear portion of the housing 12 as described further below. The flexible collar 22 is formed of a plastic material such as polyethylene and is shaped with a bore fitting the end of plunger 24 tightly to provide the friction grip thereon, while having an outside diameter frictionally engaging the sleeve ridges 20, so that the collar 22 will slide along the ridges 20 under endwise dispensing pressure from the plunger 24 when the sleeve 14 is held, but will cause the sleeve 14 when it is not held to follow the movement of plunger 24.

Figure 4:
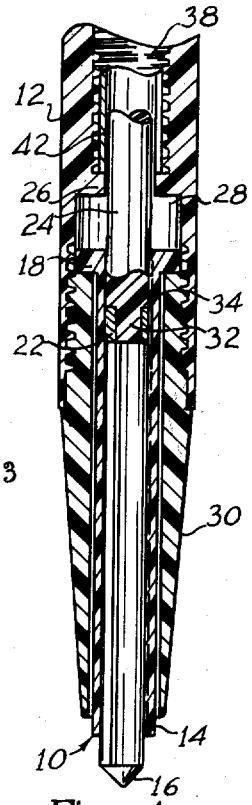
FIG. 4 is a fragmentary vertical section corresponding to FIG. 2, except for showing the marking element projected.

The previously mentioned abutment flange 18 at the rear end of the sleeve 14 provides the means by which it may be held upon application of dispensing pressure from the plunger 24; the housing 12 being formed with an internal annular flange 26 intermediately of its length, from which a forward housing portion 28 extends, that is internally threaded to engage a forward assembly sleeve or tip 30 surrounding the main body of the protective sleeve 14, and serving at its rear face as a retaining abutment for the sleeve flange 18 (see FIG. 4).

The assembly sleeve 30 is preferably formed so that its rear face is spaced forwardly from the housing flange 26 a distance sufficiently greater than the thickness of the protective sleeve flange 18 to allow movement of the protective sleeve 14 and marking element supply 16 contained therein between retracted and projected positions (compare FIGS. 2 and 4); the previously noted arrangement of the flexible collar 22 causing the protective sleeve 14 to follow retracting movement of the plunger 24, and serving with the plunger 24 to dispense the marking element supply 16 when the protective sleeve flange 18 is bottomed at the rear face of assembly sleeve 30 upon forward movement of the plunger 24.

It will be noted that the forwardly extending end of plunger 24 is reduced in diameter as at 32 to fit within the flexible collar 22, and that this reduced end 32 results in a shoulder step 34 overlying the rear face of the flexible collar 22 by which the plunger 24 is adapted for exerting endwise dispensing pressure thereon, the remaining larger diameter length of the plunger 22 being proportioned to extend freely through the protective sleeve 14.

The plunger 24 is arranged for operation as a forwardly extending portion of a propelling member 36 forming part of a feed or dispensing mechanism contained within a rear housing portion 38 that is separated by the previously mentioned annular housing flange 26 from the forward housing portion 28, but is aligned and communicates therewith through the annular flange 26 to allow the above described dispensing action of the plunger 24. The rear housing portion 38 is formed interiorly with feed screw threads 40, and has a longitudinally slotted tube 42 bottomed therein on the annular housing flange 26 and extending beyond the rear end of the housing 12. This slotted tube 42 surrounds the plunger 24 and propelling member 36, with the propelling member 26 having a lateral portion 44 extending through the longitudinal slot of the tube 42 and threaded at its outer face to engage the housing feed screw threads 40, so that rotation of the tube 42 in one direction or the other will result, respectively, in forward or rearward movement of the plunger 24.

Such operation of the plunger 24 is provided for from an operating cap 46 carried for rotation at the rear end of the housing 12 by a rear assembly sleeve 48, the operating cap 46 being formed with an internal longitudinal lug as at 50 fitting the slot in the projecting portion of the tube 42 to key the cap 46 therewith. The rear assembly sleeve is suitably arranged in threaded engagement externally of the housing 12 and may also serve to retain a pocket clip 52 thereon. Also, a friction element 54 may be arranged within the rear housing portion 38 beyond the feed screw threads 40 to support the feed mechanism against backing up under marking pressure, the foregoing details of the feed mechanism all being generally similar to the disclosure in the above noted prior Patent No. 2,595,001 to which reference is made for any further description desired.

Figure 5:
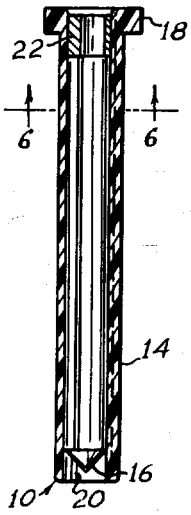
FIG. 5 is a vertical section of the marking element alone as initially arranged for use in the dispensing means.
Figure 6:
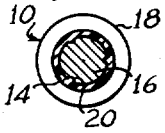
FIG. 6 is a transverse section taken substantially on the line 6—6 in FIG. 5.

In connection with the use of the flexible collar 22 for engaging the protective sleeve 14 with the feed mechanism, it should be noted that the collar 22 may be arranged to remain on the reduced plunger portion 32 when the sleeve 14 is removed from the housing 12, or to be removable with the sleeve 14, by providing for a greater frictional grip of the plunger end 32 or frictional engagement of the sleeve ridges 20, as desired. If the collar 22 is made removable with the sleeve 14, then separate collars 22 may be used for replacement, or the collar 22 may be arranged as part of a complete refill unit with the protective sleeve 14 and marking element supply contained therein, as illustrated in FIGS. 5 and 6. In any case, a protective sleeve 14 containing a fresh marking element supply 16 may be replaced in the housing 12 simply by removing the forward assembly sleeve 30 and substituting the new protective sleeve 14 in place of an exhausted one, the flexible collar 22 being replaced, if needed, separately or assembled with the sleeve 14, as explained above.

The present invention has been described in detail above for purposes of illustration only and is not intended to be limited by this description or otherwise except as defined in the appended claims.

I claim:

1. A marking element dispensing means comprising a housing having axially aligned rear and forward tubular portions separated by an inwardly extending annular flange and communicating through said flange, a feed mechanism arranged in said rear housing portion and incorporating a plunger extensible from said rear portion through said forward portion by operation of said feed mechanism at the rear end of said housing, a protective sleeve incasing a marking element supply retained by said housing in said forward portion, said protective sleeve being of a uniform interior diameter and being formed interiorly with longitudinal ridges extending throughout the length thereof, a flexible collar slidably disposed interiorly of said protective sleeve at the rear end thereof, a tubular assembly sleeve removably fixed within said forward tubular portion and surrounding said protective sleeve, the rear face of said assembly sleeve being spaced from said annular housing flange and said protective sleeve being formed with an outwardly extending flange at its rear end for retaining engagement with said housing between said assembly sleeve rear face and annular housing flange and overlying said assembly sleeve rear face, both said marking element supply and said flexible collar being of substantially the same diameter as the interior diameter of said protective sleeve and being gripped therein by said ridges while remaining free for sliding along said ridges within said protective sleeve, and said flexible collar frictionally gripping the forward end of said plunger for dispensing the marking element supply from said protective sleeve by said flexible collar and plunger through operation of said feed mechanism.

2. A marking element dispensing means comprising a housing formed intermediate its length with an annular flange which separates a rear tubular portion and an enlarged forward tubular portion, a feed mechanism arranged in said rear housing portion and incorporating a plunger extensible from said rear housing portion through said forward portion by operation of said feed mechanism at the rear end of said housing, a protective sleeve arranged within said housing and incasing a marking element supply, longitudinal ridges formed interiorly in said sleeve and extending throughout the sleeve thereof, a flexible collar disposed within said protective sleeve at the rear end thereof and frictionally gripping the forward end of said plunger, both said marking element supply and said flexible collar being of substantially the same diameter as the interior diameter of said protective sleeve and being gripped therein by said ridges while remaining free for sliding along said ridges within said protective sleeve, a tubular assembly sleeve removably fixed within said forward tubular portion and surrounding said protective sleeve with the rear face of said assembly sleeve being spaced from said annular housing flange, and said protective sleeve being formed with an outwardly extending flange at its rear end for retaining engagement within said housing between said assembly sleeve rear face and said annular housing flange, said assembly sleeve rear face being spaced from said annular housing flange at a distance sufficiently greater than the thickness of said protective sleeve flange, said protective sleeve and the marking element supply incased thereby being arranged for shifting between abutting relation with said annular housing flange in a retracted position and with said assembly sleeve rear face in a projected position, and said protective sleeve being disposed in alignment with said feed mechanism for extension of said plunger therethrough whereby dispensing of the marking element supply from said protective sleeve is performed by said flexible collar and plunger through operation of said feed mechanism.

3. A replaceable refill unit for use in a marking element dispensing device having a housing with an inwardly extending annular flange enclosing a dispensing mechanism for projecting a preformed marking element supply and a tubular assembly sleeve removably carried on said housing for containing said replaceable refill unit with the rear face of said assembly sleeve being spaced from said annular housing flange, said refill unit consisting essentially of a protective sleeve with said preformed marking element supply incased therein, said protective sleeve being formed with an outwardly extending flange at its rear end and adapted for retaining engagement with said housing between said assembly sleeve rear face and annular housing flange, interior longitudinal ridges extending throughout the length of the protective sleeve and spaced around the inner circumference thereof, a flexible collar slidably disposed interiorly of said protective sleeve and frictionally engaging said dispensing mechanism for projecting the marking element supply from the protective sleeve upon operation of said dispensing mechanism, said flexible collar having an outside diameter substantially equal to the inside diameter of said protective sleeve and serving to remove from the inner wall of the protective sleeve any adhering marking element supply, said refill unit being removable from said tubular assembly sleeve when said assembly sleeve is removed from said housing, and a new refill unit, containing a marking element supply being easily replaced within said tubular assembly sleeve upon removal of said assembly sleeve from said housing without the necessity of touching the marking element supply during removal of the used refill unit and replacement with the new refill unit.

*4. A marking element dispensing means comprising a hollow assembly sleeve, a tubular housing engaging said assembly sleeve and leaving an intervening chamber, a plastic protective sleeve of continuous annular cross section disposed within said assembly sleeve, an external flange on said protective sleeve having place in said chamber, and inwardly projecting ridges integral with said protective sleeve.*

*5. A pencil tip comprising a hollow sheath, a pencil body engaging said sheath and leaving an intervening chamber, a plastic sleeve of continuous annular cross-section disposed within said sheath, an external flange on said sleeve having place in said chamber, and inwardly projecting splines integral with said sleeve.*

References Cited by the Examiner

The following references, cited by the Examiner, are of record in the patented file of this patent or the original patent.

UNITED STATES PATENTS

| | | |
|---|---|---|
| 1,425,066 | 8/22 | Stickney. |
| 1,494,999 | 5/24 | Crouse et al. |
| 1,510,613 | 10/24 | Slack. |
| 1,698,353 | 1/29 | Vierling. |
| 1,902,809 | 3/33 | Bienenstein. |
| 2,023,865 | 12/35 | Weaver et al. |
| 2,595,001 | 4/52 | Sams et al. |

FOREIGN PATENTS

| | | |
|---|---|---|
| 646,559 | 7/28 | France. |
| 574,328 | 4/33 | Germany. |

CHARLES A. WILLMUTH, *Primary Examiner.*

LEONARD W. VARNER, *Examiner.*